Figure 1:
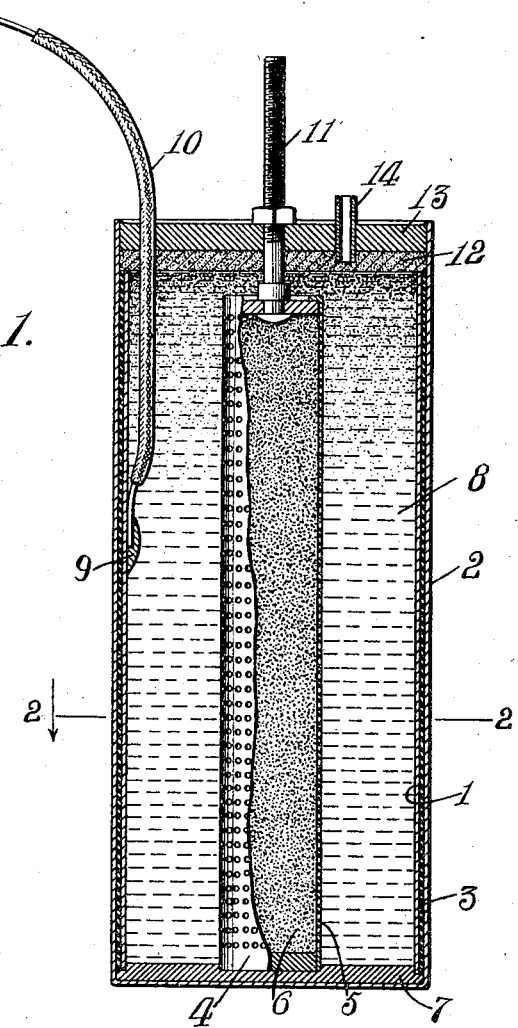

E. McGALL & M. D. MALCOMSON.
GALVANIC BATTERY.
APPLICATION FILED AUG. 12, 1914.

1,201,481.

Patented Oct. 17, 1916.

WITNESSES:
J. A. Brophy
William A. Hardy

INVENTORS
Edward McGall
and
Malcolm D. Malcomson
BY Dyer and Holden
their ATTORNEYS

UNITED STATES PATENT OFFICE.

EDWARD McGALL, OF ORANGE, AND MALCOLM D. MALCOMSON, OF WEST ORANGE, NEW JERSEY, ASSIGNORS TO NEW JERSEY PATENT COMPANY, OF WEST ORANGE, NEW JERSEY, A CORPORATION OF NEW JERSEY.

GALVANIC BATTERY.

1,201,481.  Specification of Letters Patent.  Patented Oct. 17, 1916.

Application filed August 12, 1914. Serial No. 856,331.

*To all whom it may concern:*

Be it known that we, EDWARD McGALL, a citizen of the United States, and a resident of Orange, Essex county, New Jersey, and MALCOLM D. MALCOMSON, a citizen of the United States, and a resident of West Orange, Essex county, New Jersey, have invented certain new and useful Improvements in Galvanic Batteries, of which the following is a description.

Our invention relates generally to galvanic batteries and more particularly to an improved electrolyte for such batteries; and while directed especially to primary batteries of the type commonly known as dry cells, wherein the electrolyte is either retained in such a manner or is itself in such a condition that it will not flow from the cells when the latter are tipped or inverted, it is to be understood that many of the features of our invention are applicable to batteries of other types, for example, storage batteries.

The principal object of our invention is to provide for batteries of this character, an improved gelatinous electrolyte, preferably in a colloidal state, whereby the capacity and rate of discharge of such batteries will be greatly increased and whereby the potential will remain substantially uniform throughout the life thereof.

Another object of our invention is to provide a dry battery cell wherein there will be practically no drying out of the electrolyte or deterioration of the electrodes when the cell is on open circuit, and whereby an increased diffusion of the substances which are dissolved during the operation of the cell will be obtained.

Our invention also comprises the method of forming the improved gelatinous electrolyte.

Other objects and features of our invention will be hereinafter more fully described and claimed.

Practically all of the well known forms of dry battery cells employ zinc and carbon for the positive and negative electrodes respectively, manganese dioxid or a similar substance as the depolarizing agent, and a neutral or nearly neutral solution as the electrolyte; the electrolyte being formed into a sticky or pasty mud-like mass, commonly called the "battery mix," either by mixing a solution of the electrolyte with a suitable dry substance or by pouring liquid on a dry substance containing the electrolytic material. These cells, however, have a comparatively low capacity and discharge rate and rapidly deteriorate when on open circuit and also decrease in efficiency under operation, which apparently is largely due to the properties and characteristics of the "battery mix" employed therein. We have discovered that by using a colloidal gelatinous electrolyte, these defects are largely obviated and that when, for example, zinc and oxid of copper are employed as the positive and negative electrodes respectively and an alkaline colloidal gelatinous solution as the electrolyte of a cell, the efficiency of such cell is greatly increased, being in fact greater than that of a wet primary battery employing similar electrodes and an alkaline electrolyte. This is due, in part, to certain peculiar characteristics and properties of the colloidal gelatinous electrolyte which permit sufficient diffusion of the particles dissolved from the positive electrode to prevent saturation thereby of the active electrolytic material adjacent the surfaces of the electrodes, thereby insuring the exposure of the entire active surfaces of the electrodes to the action of the electrolyte throughout the life of the cell. The presence of the starch grains or other particles of organic material in the colloidal solution also apparently increases the ionization of the electrolyte whereby the capacity and conductance of the latter are increased.

Briefly described, the preferred form of our improved cell comprises a zinc positive electrode, an oxid of copper negative electrode and a colloidal gelatinous alkaline electrolyte. This electrolyte is preferably made by combining a caustic alkaline solution and a solution of suitable organic material; although we have found it possible for cells where a neutral or substantially neutral electrolyte is required to produce a colloidal gelatinous electrolytic solution from a substantially non-alkaline material, either with or without combining the same with an organic material. The electrolyte is preferably formed by properly combining a heated solution of caustic soda or sodium hydroxid, the density of this solution depending on the size and capacity of the cell for which the electrolyte is intended, and a heated solution of either one or a combination of organic materials such as tapioca, wheat and other grains, gelatin, glue, gums, syrupy extracts, fruit extracts, potato and similar starch cells, starch, casein, etc., and then cooling the mixture or permitting the same to cool, whereby a gelatinous colloidal solution in the presence of the caustic will be obtained. In some cases it is necessary, after mixing the heated solutions as described, to further heat the mixture in order to obtain a colloidal gelatinous solution, while in others it has been found that a gelatinous colloidal solution will be produced by merely mixing the heated solutions as described and without applying further heat to the mixture and without cooling the same. To the colloidal gelatinous electrolytic solution thus obtained may be added one or more other inorganic materials, such as various silicates, chromates, bi-chromates etc., in order to increase the capacity and conductance thereof. We do not wish to confine ourselves to the use of sodium hydroxid as the alkaline employed in making the colloidal gelatinous electrolyte, as we have found that the use of other alkalines, such as potassium or lithium hydroxid, will give efficient results. Certain combinations of the alkalines mentioned are also advantageous, for example, the addition of a small amount of lithium hydroxid to an electrolyte of the character described and containing sodium hydroxid increases the capacity of the electrolyte to a very appreciable extent. For the organic material employed in forming the electrolyte, we find that starch or materials rich in starch give the best results. Where starch is employed, it is preferable, in forming the electrolyte, to first dissolve the starch in cool water in order to obtain a very smooth and uniform solution, to then heat this solution and combine the same with the heated caustic alkaline solution, and finally, if necessary, to heat the mixture so obtained. The gases which are generated by the normal action of a cell employing an electrolyte of the character above described are, because of the viscosity and colloidal nature of the electrolyte, either absorbed in or held in suspension by the electrolyte in the form of small bubbles, or partly absorbed and partly held in suspension thereby, thus making it practical for ordinary service to hermetically seal the cell.

In order that our invention may be more clearly understood, attention is directed to the accompanying drawing forming a part of this specification and in which—

Figure 2:
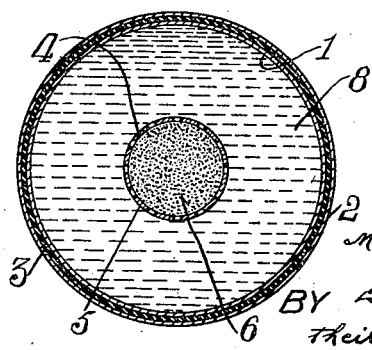

Figure 1 is a central vertical sectional view of a dry primary battery cell constructed in accordance with our invention; and Fig. 2 is a sectional view of the cell taken on line 2—2 of Fig. 1.

Referring to the drawing, reference character 1 represents the positive electrode which is preferably of zinc and in the form of a hollow cylinder. The zinc positive electrode is either cast or rolled to form and is preferably amalgamated in order to reduce its solution pressure and thus prevent any appreciable dissolution thereof when the cell is on open circuit. The positive electrode is disposed in a cylindrical iron or tin plated metallic container 2 and is separated and insulated from the side walls of the container by a cylindrical shell 3 of fibrous or other insulating material, preferably impregnated with a material impervious to the action of the electrolyte. Reference character 4 represents the negative electrode which preferably consists of a metallic perforated tubular member 5 filled with a mass of pulverized or flaked oxid of copper 6. At the bottom of the container is a mass 7 of insulating material. This insulating material is preferably plastic, and is poured into the container while hot, the electrodes being then inserted into the container and set into the plastic material while the latter is still soft, with the negative electrode positioned substantially centrally of the container, whereby when the plastic material cools and hardens, the electrodes will be firmly held thereby in the positions shown. The upper ends of the cylindrical positive electrode and the shell 3 surrounding the same terminate some distance below the top of the container and the upper end of the negative electrode terminates a short distance below the top of the positive electrode. The container is filled to a level above the negative electrode 4 and nearly to the top of the positive electrode 1, with a colloidal gelatinous alkaline electrolyte 8 of the character hereinbefore described. The positive electrode 1 is formed near the middle thereof with a projection 9 forming one terminal of the cell, to which is suitably secured the conductor 10, and the negative electrode has secured to the top thereof a bolt 11 extending above the container and forming the other terminal of the cell. A layer 12 of absorbent or porous material, such as sand, is disposed on top of the electrolyte 8 and extends to a level above the positive electrode 1 and the insulating shell 3, but slightly below the top edge of the container 2. We find it advisable to employ this layer of porous material in order to take care of any excess pressure in the cell which is sometimes generated when the same is subjected to heavy duty. The cell is sealed by a layer 13 of plastic material disposed on top of the layer 12 of porous material and extending practically to the top of the container 2.

Reference character 14 represents a small vent extending through the seal 13 and into the layer 12 of porous material. This vent serves to relieve any unusually excessive pressure in the cell such, for example, as might be generated if the cell were suddenly subjected to very heavy duty and discharged for a short time above its normal rating.

It is to be understood that our invention is not limited to the embodiments and features specifically shown and described herein, but that such features and embodiments are subject to many changes and modifications without any departure from the spirit of our invention.

Having now described our invention what we claim as new and desire to protect by Letters Patent of the United States is as follows:

1. In a galvanic battery, a colloidal gelatinous electrolyte containing in combination, alkaline and organic materials, and another inorganic material which acts to increase the capacity and conductance thereof, substantially as described.

2. In a galvanic battery, a colloidal gelatinous electrolyte containing in combination, caustic alkaline and organic materials, and another inorganic material which acts to increase the capacity and conductance thereof, substantially as described.

3. In a galvanic battery, a colloidal gelatinous electrolyte containing in combination, sodium hydroxid, an organic material, and another inorganic material which acts to increase the capacity and conductance thereof, substantially as described.

4. In a galvanic battery, a colloidal gelatinous electrolyte containing in combination, sodium hydroxid, an organic material, and a silicate to increase the capacity and conductance thereof, substantially as described.

5. In a galvanic battery, a colloidal gelatinous electrolyte containing in combination, a plurality of alkaline materials and another inorganic material which acts to increase the capacity and conductance thereof, substantially as described.

6. In a galvanic battery, a colloidal gelatinous electrolyte containing in combination, sodium hydroxid, one or more additional alkaline materials, and another inorganic material which acts to increase the capacity and conductance thereof, substantially as described.

7. In a galvanic battery, a colloidal gelatinous electrolyte containing in combination, sodium hydroxid, one or more additional alkaline materials, and a silicate to increase the capacity and conductance thereof, substantially as described.

8. The method of forming a colloidal gelatinous electrolyte for galvanic batteries, which consists in making an alkaline solution, making a solution of organic material, heating one of such solutions, mixing the solutions, and then further heating the mixture, substantially as described.

9. The method of forming a colloidal gelatinous electrolyte for galvanic batteries, which consists in making an alkaline solution, dissolving material containing starch in cool water to obtain a smooth and uniform solution of such material, then heating the solution of the material containing starch, and finally mixing the said solutions, substantially as described.

10. A gelatinous battery electrolyte containing an organic starchy material, sodium hydroxid, and lithium hydroxid, substantially as described.

11. A gelatinous battery electrolyte, containing an organic starchy material, sodium hydroxid, lithium hydroxid, and a silicate, substantially as described.

12. A gelatinous battery electrolyte containing an organic starchy material, lithium hydroxid, and a hydroxid of an alkali other than lithium, substantially as described.

13. A gelatinous battery electrolyte containing an organic starchy material, lithium hydroxid, a hydroxid of an alkali other than lithium, and a silicate, substantially as described.

This specification signed and witnessed this 10th day of August, 1914.

EDWARD McGALL.
MALCOLM D. MALCOMSON.

Witnesses:
WILLIAM A. HARDY,
MARY J. LAIDLAW.